(12) United States Patent
Li

(10) Patent No.: US 8,837,366 B2
(45) Date of Patent: Sep. 16, 2014

(54) METHOD TO USE NETWORK MEASUREMENTS TO OPTIMIZE MOBILE WIRELESS DEVICE PERFORMANCE

(75) Inventor: Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 13/423,875

(22) Filed: Mar. 19, 2012

(65) Prior Publication Data

US 2013/0242763 A1  Sep. 19, 2013

(51) Int. Cl.
*H04W 4/00* (2009.01)
*H04W 24/02* (2009.01)

(52) U.S. Cl.
CPC .................................... *H04W 24/02* (2013.01)
USPC ....................................... 370/328; 370/395.4

(58) Field of Classification Search
CPC ............... H04W 24/00; H04W 24/02; H04W 52/02–52/0296
USPC ......... 370/328, 329, 331, 341, 459, 311, 332, 370/395.4; 455/422.1, 436, 450, 452.1
See application file for complete search history.

(56) References Cited

U.S. PATENT DOCUMENTS

| | | | |
|---|---|---|---|
| 7,747,275 B2 | 6/2010 | Funnell et al. | |
| 8,200,251 B2 * | 6/2012 | Huang | 455/457 |
| 8,468,196 B1 * | 6/2013 | Roskind et al. | 709/203 |
| 2005/0190720 A1 * | 9/2005 | Miyake et al. | 370/328 |
| 2007/0270142 A1 * | 11/2007 | Willey et al. | 455/434 |
| 2008/0130594 A1 * | 6/2008 | Suzuki | 370/338 |
| 2009/0135791 A1 * | 5/2009 | Kawamura et al. | 370/337 |
| 2010/0014419 A1 * | 1/2010 | Lee et al. | 370/225 |
| 2010/0062764 A1 | 3/2010 | Aiouaz et al. | |
| 2010/0172272 A1 | 7/2010 | Tenny | |
| 2011/0117963 A1 | 5/2011 | Wang et al. | |
| 2012/0009900 A1 * | 1/2012 | Chawla | 455/411 |
| 2012/0213073 A1 * | 8/2012 | Ang et al. | 370/235 |
| 2012/0264416 A1 * | 10/2012 | Pica et al. | 455/422.1 |
| 2013/0084884 A1 * | 4/2013 | Teyeb et al. | 455/456.1 |
| 2013/0188543 A1 * | 7/2013 | Dwyer et al. | 370/311 |

FOREIGN PATENT DOCUMENTS

WO  WO 2010/058076  5/2010

* cited by examiner

*Primary Examiner* — Ricky Ngo
*Assistant Examiner* — Kabir Jahangir
(74) *Attorney, Agent, or Firm* — Womble Carlyle Sandridge & Rice LLP

(57) ABSTRACT

Method and apparatus for managing connections and state transitions between a mobile wireless device and a wireless network are described. The mobile wireless device measures network characteristics of radio sectors in the wireless network and saves the measured network characteristics in a database, later retrieving the network characteristics and determining data inactivity timeout values for the radio sector. The mobile wireless device manages connections and state transitions based on the determined data inactivity timeout values. The database of network characteristics is organized by geographic location.

25 Claims, 12 Drawing Sheets

METHOD TO USE NETWORK MEASUREMENTS TO OPTIMIZE MOBILE WIRELESS DEVICE PERFORMANCE

TECHNICAL FIELD

The described embodiments generally relate to methods and apparatuses for optimizing performance of mobile wireless devices. More particularly, the present embodiments describe use of network measurements of network timing characteristics to improve operating performance of mobile wireless devices.

BACKGROUND

Wireless networks continue to evolve as new communication technologies develop and standardize. A representative wireless network for a wireless network service provider can include support for one or more releases of wireless communication protocols specified by the Third Generation Partnership Project (3GPP) and Third Generation Partnership Project 2 (3GPP2) communication standards organizations. The 3GPP develops wireless communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 develops wireless communication standards that include CDMA2000 1×RTT and 1×EV-DO standards. Each wireless communication standard includes operational parameters for wireless network equipment including mobile wireless devices. Some operational characteristics, such as network timing characteristics, can be expressed as a range of values or can be not specified in the wireless communication standard. A mobile wireless device operating in a wireless network can be not informed of specific values for network timing characteristics for the radio sector of the wireless network in which the mobile wireless device is operating. Representative network timing characteristics can include a number of inactivity timeout values that can cause a connection between the wireless network and the mobile wireless device to be released or can transition the mobile wireless device between operating states. In order to optimize operating performance, the mobile wireless device can prefer to transition between different operating states and to establish, maintain and release connections under its own control rather than according to timing determined by the wireless network, at least where the wireless communication standard allows such flexibility. Power consumption by the mobile wireless device can depend on the operating state in which the mobile wireless device operates. By controlling the operating state, the mobile wireless device can conserve power when limited amounts or no data is available for transmission. In addition, a user's experience in using the mobile wireless device can be affected by responsiveness to user input, and "always on" connections can provide quicker immediate feedback than when connections need be established. Maintaining a connection during brief periods of data inactivity can ensure rapid response when data transmission resumes. Each radio sector (also referred to as a cell) of a wireless network to which a mobile wireless device can be associated or connected can use different values for network timing characteristics. As the actual values can be unknown a priori to the mobile wireless device, there exists a need to measure network timing characteristics and to use the measured characteristics to optimize performance of the mobile wireless device.

SUMMARY OF THE DESCRIBED EMBODIMENTS

In one embodiment, a method of managing connections between a mobile wireless device and a wireless network is described. The method includes at least the following steps when a PDP context is established between the mobile wireless device and the wireless network. In a first step, the mobile wireless device retrieves network timing characteristics for a radio sector of the wireless network from a database. The mobile wireless device determines a data inactivity timeout value for the radio sector based on the retrieved network timing characteristics of the radio sector. The mobile wireless device measures an elapsed time period after transmitting to the wireless network a most recently transmitted data packet and transmits a data packet to the wireless network when the elapsed time period equals the data inactivity timeout value. In an embodiment, the mobile wireless device maintains the database of measured network timing characteristics organized by a geographic location identifier for the radio sector.

In another embodiment, a method of managing state transitions in a mobile wireless device connected to a radio sector of a wireless network is described. The method includes at least the following steps. In a first step, the mobile wireless device retrieves network state transition timing information for the radio sector of the wireless network from a database. The mobile wireless device determines a network based data inactivity timeout value for a state transition of the mobile wireless device from a first state to a second state based on the retrieved network state transition timing information for the radio sector of the wireless network. The mobile wireless device sets a mobile wireless device based data inactivity timeout value less than the determined network based data inactivity timeout value for the state transition of the mobile wireless device from the first state to the second state. After detecting a time period of data inactivity at the mobile wireless device exceeding the set mobile device data inactivity timeout value, the mobile wireless device transitions from the first state to the second state. In an embodiment, the network based data inactivity timeout value is associated with a state transition from the first state having an active data connection between the mobile wireless device and the wireless network to the second state having no active data connection.

In a further embodiment, a mobile wireless device including a transceiver and a configurable processor is described. The receiver transmits signals to and receives signals from a wireless network. The processor is configured to measure network characteristics of radio sectors of the wireless network in which the mobile wireless device operates. The processor is also configured to store the measured network characteristics in a database in the mobile wireless device. The processor is further configured to retrieve one or more stored network characteristics of the radio sector to which the mobile wireless device is connected from the database and to determine a network timeout value based on the retrieved network characteristics of the radio sector. The processor is configured to measure a time period of inactivity after transmission of a data packet and to transmit a dummy data packet when the measured time period exceeds the determined network timeout value. In an embodiment, the processor is further configured to monitor the physical location of the mobile wireless device by tracking at least one of a global positioning system location of the mobile wireless device, a WiFi access point location and a radio sector site location of the wireless network and to determine the geographic location identifier of the radio sector based on the monitored physical location of the mobile wireless device.

In another embodiment, computer program product encoded in a non-transitory computer readable medium for managing state transitions in a mobile wireless device connected to a radio sector of a wireless network is described. The computer program product in the mobile wireless device includes the following computer program code. Computer program code for retrieving network characteristics for the radio sector of the wireless network from a database. Computer program code for determining a network based data inactivity timeout value for a state transition of the mobile wireless device from a first state to a second state based on the retrieved network characteristics for the radio sector of the wireless network. Computer program code for setting a mobile wireless device based data inactivity timeout value less than the determined network based data inactivity timeout value for the state transition of the mobile wireless device from the first state to the second state. Computer program code for detecting a time period of data inactivity at the mobile wireless device exceeding the set mobile wireless device based data inactivity timeout value. Computer program code for transitioning the mobile wireless device from the first state to the second state after detecting the time period of data inactivity at the mobile wireless device. In an embodiment, the network based data inactivity timeout value is associated with a state transition from the first state having an active data connection between the mobile wireless device and the wireless network to the second state having no active data connection.

Although described in terms of a UMTS wireless network, the embodiments disclosed herein can be extended to include GSM networks, CDMA2000 1x/EV-DO networks and LTE/LTE-Advanced networks as well.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
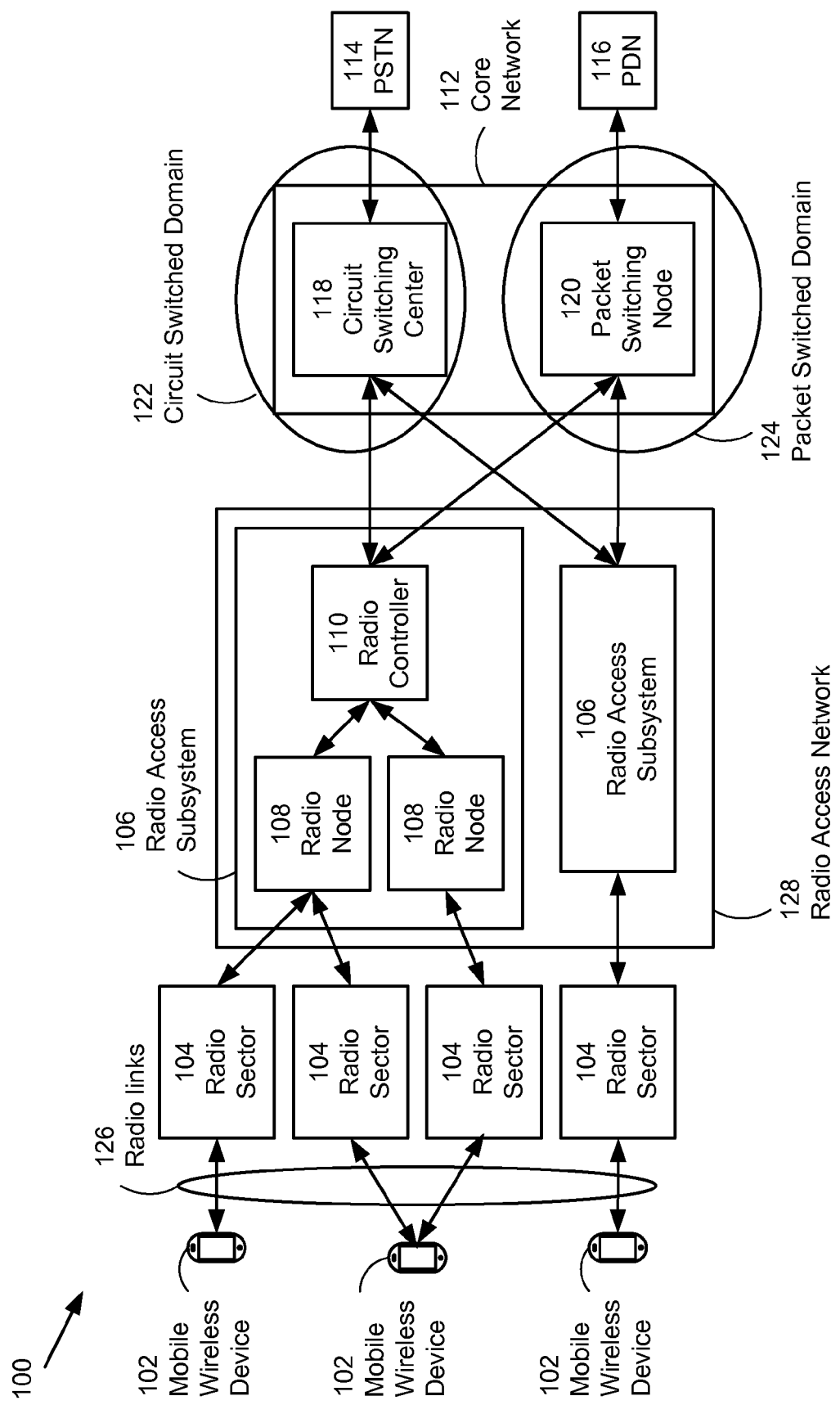
FIG. 1 illustrates components of a generic wireless communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for managing connections and state transitions in a wireless mobile wireless device connected to a radio sector of a wireless network. Representative embodiments are described for simplicity in relation to a UMTS wireless network; however other implementations of the same methods and apparatuses can apply to mobile wireless devices used in other types of wireless networks. For example, the same teachings could also be applied to a GSM wireless network, a CDMA2000 1x/EV-DO wireless network, and an LTE/LTE-Advanced wireless network or to other wireless networks using voice and packet data wireless communications. In general, the teachings described herein can apply to a mobile wireless device operating in a wireless network based on radio frequency access technology.

Wireless communication network deployments continue to evolve as wireless communication network technology advances and new or updated wireless communication protocols are standardized. Circuit switched networks continue to offer voice services, while packet switched networks expand from data oriented services to include a multiplicity of services including video and packet voice. Mobile wireless devices also continue to increase in functionality to supplement voice connections with multimedia internet connectivity and advanced resolution displays in compact form factors. Users can desire both responsiveness and extended battery life from a multi-functional mobile wireless device. For responsiveness, maintaining connections to a wireless network during brief periods of inactivity can provide ready access to internet services. For extended battery life, minimizing power consumption during longer periods of inactivity can conserve stored battery power. Several different timeout mechanisms specified by wireless communication protocols can determine when a wireless network transitions a mobile wireless device from a higher power consumption state to a lower power consumption state, and also when to tear down an active data connection and/or signaling connection in order to reassign scarce radio frequency access resources to other mobile wireless devices. Wireless networks can share radio frequency resources in an access network among multiple mobile wireless devices. As such, active connections between the mobile wireless device and the wireless network can be dropped after a period of data transmission inactivity in order to reallocate the radio frequency resources until required by the mobile wireless device. The user of the mobile wireless device, however, can prefer that the mobile wireless device be immediately responsive when data transmission activity resumes, without any perceptible delay to re-establish connections between the mobile wireless device and the wireless network. Each radio sector within a wireless network can use different timeout values, so the mobile wireless device can not know a priori timeout values of the radio sector to which the mobile wireless device is connection and adjust its behavior accordingly. Instead, the mobile wireless device can observe network characteristics and store values for those observed network characteristics in a database. The database can be organized based on a geographic location or based on a unique network element identifier such that the mobile wireless device can learn and re-use values for network characteristics. With knowledge of network characteristics, such as state transition timing characteristics and connection release timeout values, the mobile wireless device can take actions to provide a balance between responsiveness and power consumption for the user of the mobile wireless device. In a representative embodiment, the mobile wireless device can maintain a connection during brief periods of data inactivity by sending a data packet to the wireless network before a connection release timeout for the radio sector of the wireless network occurs. The mobile wireless device can retrieve a previously measured value for the connection release timeout stored in the database for a current radio sector of the wireless network to which the mobile wireless device is connected. Similarly, when a more extended period of data inactivity can occur, the mobile wireless device can release connections and/or transition from higher power consumption states to lower power consumption states in advance of a timeout for the wireless network based on knowledge of the state transition timing characteristics of the radio sector. Measurements of network characteristics can be stored, retrieved and used to optimize performance of the mobile wireless device when operating within a radio sector of the wireless network.

These and other embodiments are discussed below with reference to FIGS. 1-12. However, those skilled in the art will readily appreciate that the detailed description given herein with respect to these figures is for explanatory purposes only and should not be construed as limiting.

FIG. 1 illustrates a representative generic wireless communication network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency carrier at a selected frequency. Radio sectors 104 can have different geometric shapes depending on antenna configuration, such as radiating outward in an approximate circle or hexagon from a centrally placed radio node 108 or cone shaped for a directional antenna from a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126. Radio sectors 104 can also be referred to as cells in some wireless networks; however, the description herein will use the generic term "radio sector." The wireless network 100 can determine network characteristics for each radio sector 104 that can include network timing values, such as for establishing and releasing connections between the mobile wireless device 102 and a radio node 108. The wireless network 100 can also determine state transition timing mechanisms that can determine when to transition a mobile wireless device 102 connected through the radio sector 104 to the wireless network 100 between different operating states. While the mobile wireless device 102 can have direct knowledge of certain network timing values, such as those that are fixed by a wireless communication standard, other network characteristics can vary over a range of values and/or can be only known through observation and measurement. The mobile wireless device 102 can measure and remember key network characteristics for each radio sector 104 of the wireless network 100 in order to modify its own behavior to provide a balance between responsiveness and power conservation for the user of the mobile wireless device 102.

In some wireless networks 100, the mobile wireless device 102 can be connected to more than one radio sector 104 simultaneously. The multiple radio sectors 104 to which the mobile wireless device 102 is connected can come from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128. The radio controller 110 in the radio access subsystem 106 can thus control some of the network timing characteristics that can be observed, measured and stored in a database by the mobile wireless device 102. Radio links 126 can be set up and torn down by the radio access subsystem 106 to provide connections for both voice/data services and for signaling between the mobile wireless device 102 and the wireless network 100. As radio frequency resources provided by the radio access network 128 can be scarce and shared among multiple different mobile wireless devices 102 simultaneously, the wireless network 100 can re-allocate radio resources as required to balance throughput capacity to multiple users of the wireless network 100.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
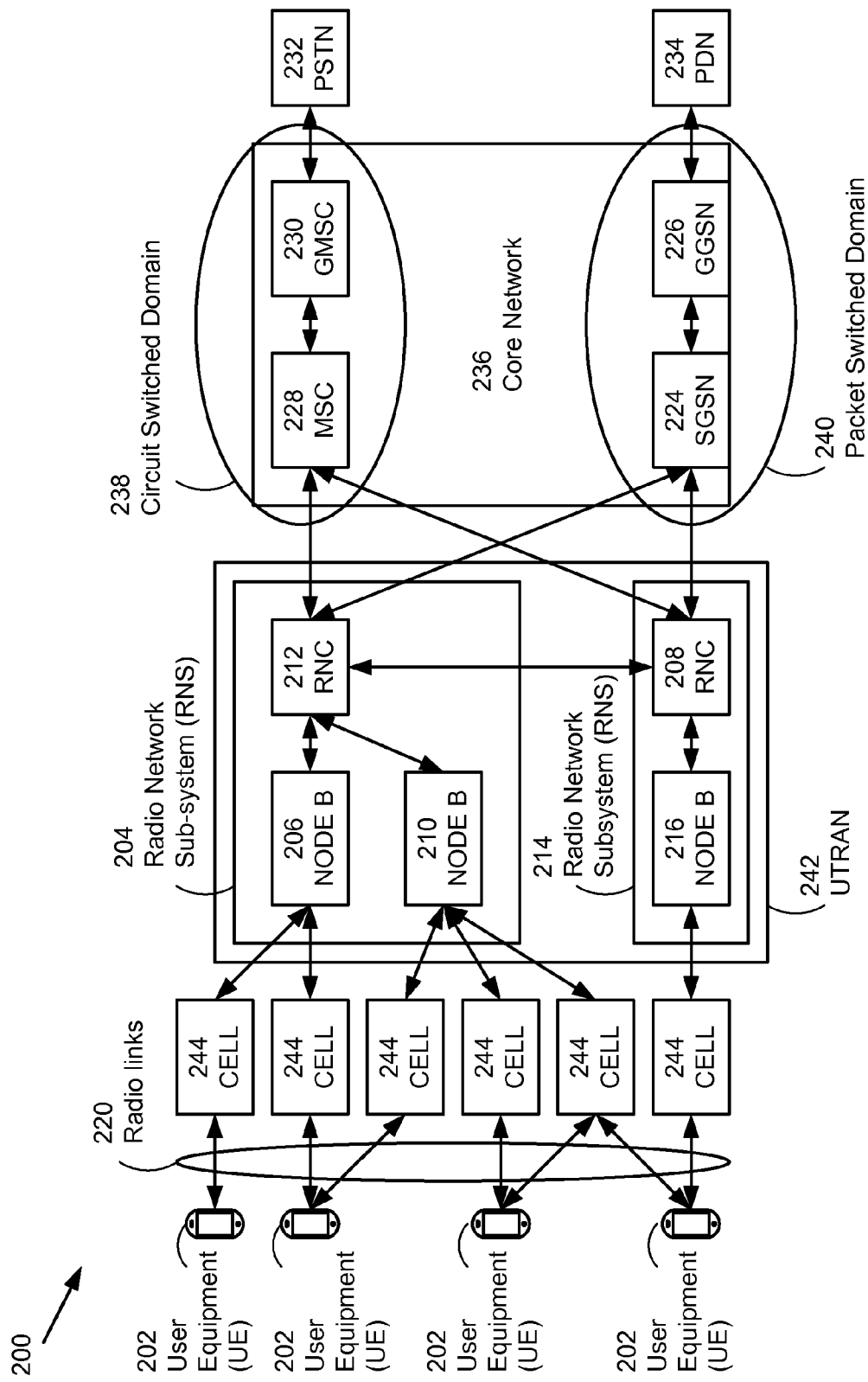
FIG. 2 illustrates components of a UMTS wireless communication network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. The UE 202 shown for the UMTS wireless network 200 in FIG. 2 can be equivalent to the mobile wireless device 102 shown for the generic wireless network 100 in FIG. 1. The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network sub-systems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and intended for the UE 202. Each RNC 208/212 can handle the assignment and management of radio resources for the cells 244 through which the UE 202 connects to the UMTS wireless network 200 and can operate as an access point for the UE 202 with respect to the core network 236. The Node-B 206/210/216 can receive information sent by the physical layer of UE 202 through an uplink and transmit data to UE 202 through a downlink and can operate as an access point of the UTRAN 242 for UE 202.

UTRAN 242 can construct and maintain a radio access bearer (RAB) for communication between UE 202 and the core network 236. Services provided to a specific UE 202 can include circuit switched (CS) services and packet switched (PS) services. For example, a general voice conversation can be transported through a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet" A packet data protocol (PDP) context can be established between the GGSN 226 and the UE 202 to support packet data services between the PDN 234 and the UE 202. With a PDP context established, an internet protocol (IP) address can be associated with the UE 202. While data traffic between the UE 202 and the UMTS wireless network 200 can be transmitted in bursts, it can be preferred to maintain the PDP context during brief periods of data inactivity rather than having to re-establish the PDP context when data is available for transfer to/from the UE 202. By maintaining the PDP context, the IP address associated with the UE 202 can remain constant.

Figure 3:
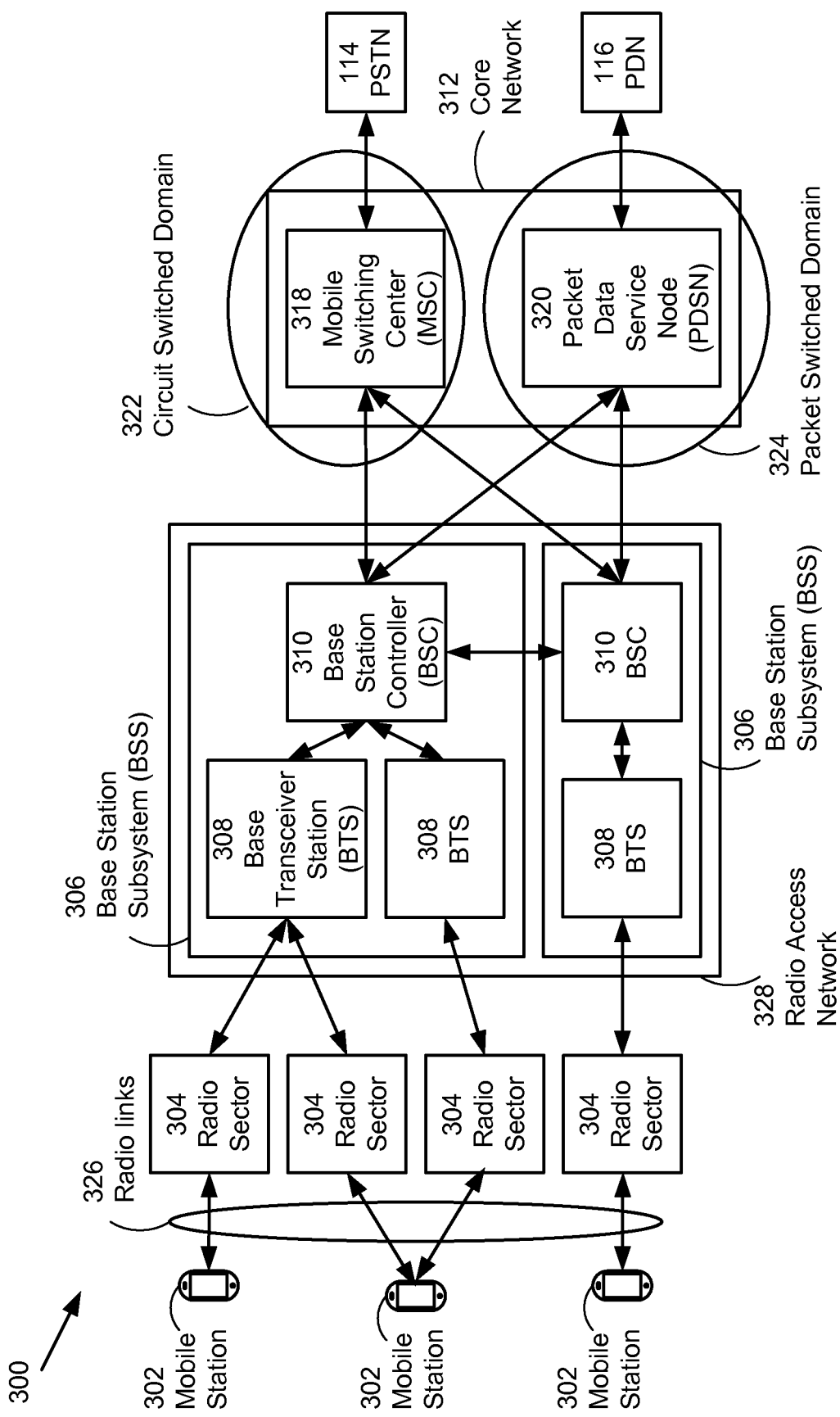
FIG. 3 illustrates components of a CDMA2000 1x wireless communication network.

FIG. 3 illustrates a representative CDMA2000 1× wireless network 300 that can include elements comparable to those described earlier for the generic wireless network 100 and the UMTS wireless network 200. Multiple mobile stations 302 can connect to one or more radio sectors 304 through radio frequency links 326. Each radio sector 304 can radiate outward from a base transceiver station (BTS) 308 that can connect to a base station controller (BSC) 310, together forming a base station subsystem (BSS) 306. Multiple base station subsystems 306 can be aggregated to form a radio access network 328. Base station controllers 310 in different base station subsystems 306 can be interconnected. The base station controllers 310 can connect to both a circuit switched domain 322 that use multiple mobile switching centers (MSC) 318 and a packet switched domain 324 formed with packet data service nodes (PDSN) 320, which together can form a core network 312 for the wireless network 300. As with the other wireless networks 100/200 described above, the circuit switched domain 322 of the core network 312 can interconnect to the PSTN 114, while the packet switched domain 324 of the core network 312 can interconnect to the PDN 116.

Figure 4:
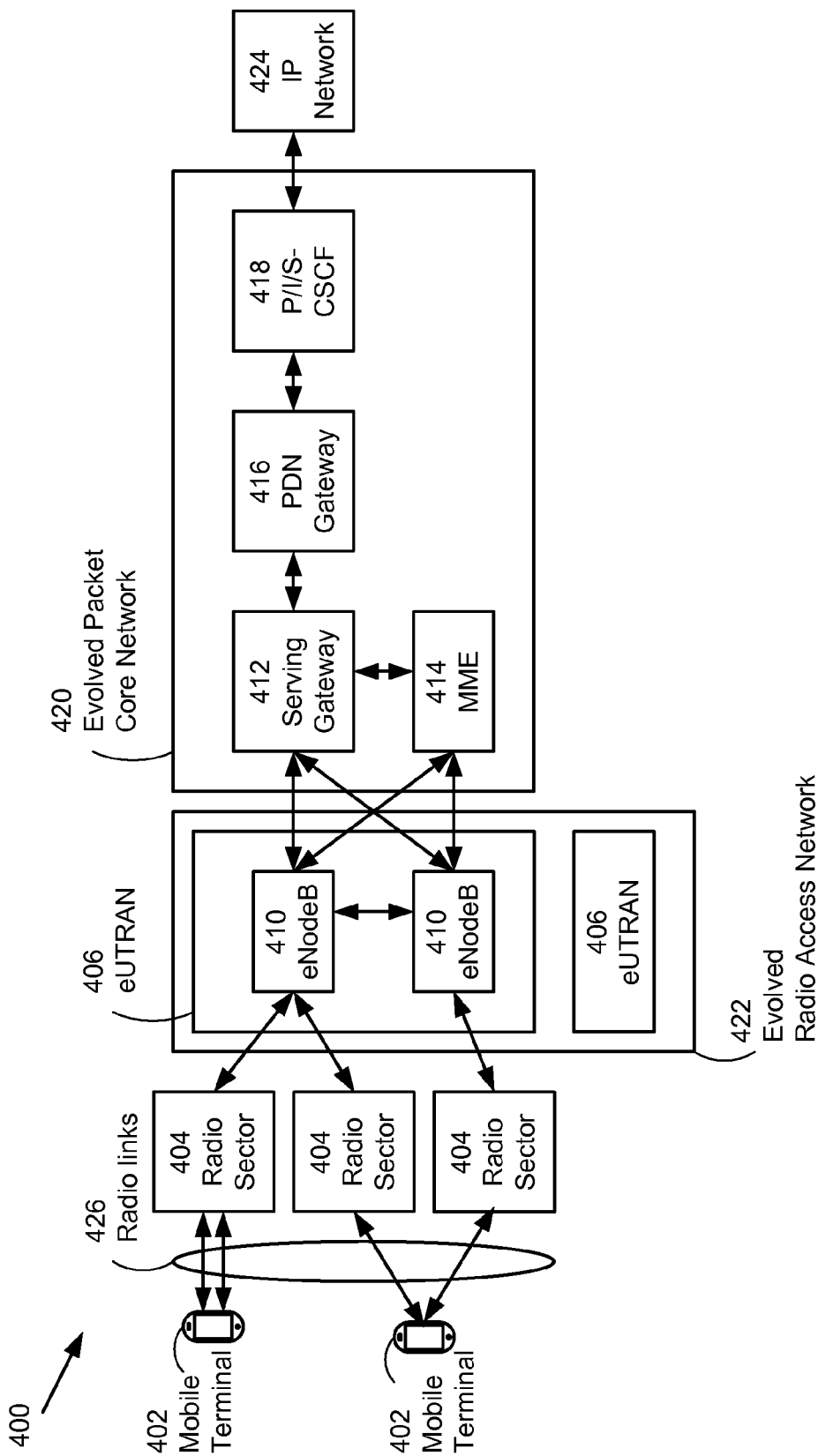
FIG. 4 illustrates components of a LTE wireless communication network.

FIG. 4 illustrates a representative Long Term Evolution (LTE) wireless network 400 architecture designed as a packet switched network exclusively. A mobile terminal 402 can connect to an evolved radio access network 422 through radio links 426 associated with radio sectors 404 that emanate from evolved Node B's (eNodeB) 410. The eNodeB 410 includes the functions of both the transmitting and receiving base stations (such as the Node B 206 in the UMTS network 200 and the BTS 308 in the CDMA2000 network 300) as well as the base station radio controllers (such as the RNC 212 in the UMTS network 200 and the BSC 310 in the CDMA2000 network 300). The equivalent core network of the LTE wireless network 400 is an evolved packet core network 420 including serving gateways 412 that interconnect the evolved radio access network 422 to public data network (PDN) gateways 416 that connect to external internet protocol (IP) networks 418. Multiple eNodeB 410 can be grouped together to form an evolved UTRAN (eUTRAN) 406. The eNodeB 410 can also be connected to a mobility management entity (MME) 414 that can provide control over connections for the mobile terminal 402.

Figure 5:
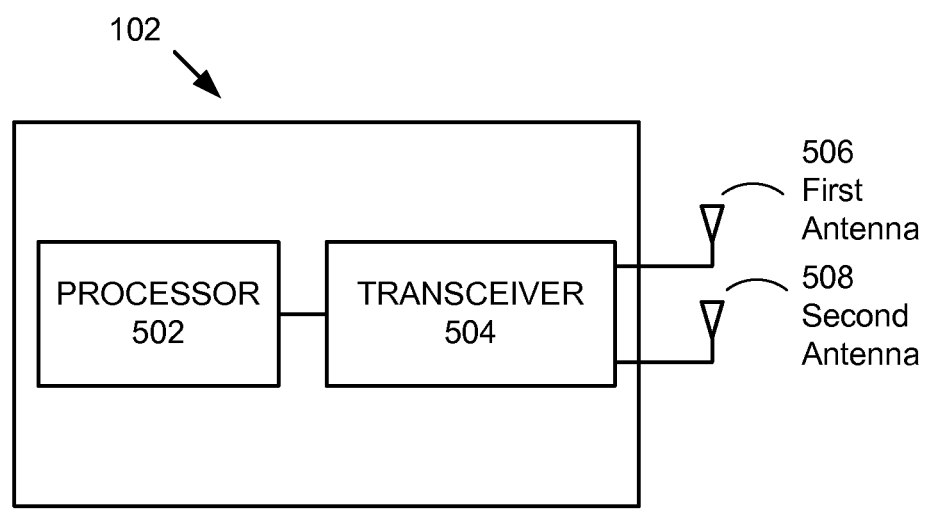
FIG. 5 illustrates a representative architecture for a mobile wireless communication device.

FIG. 5 illustrates select elements of a mobile wireless device 102. The mobile wireless device 102 can include a transceiver 504 that can process signals according to one or more wireless communication protocols. The transceiver 504 can be connected to a processor 502 that can provide higher layer functions, such as requesting establishment and release of connections for various resident application services. The processor 502 can also measure, analyze, store and retrieve network characteristics in a database to determine actions to take in order to optimize performance of the mobile wireless device 102. While depicted as a single block in FIG. 5, the processor 502 can also be divided among multiple elements, such as among an application processor that can execute applications that can interact with the user of the mobile wireless device 102 and a baseband processor that can encode and decode signals that can interface with the wireless network 100 through the transceiver 504. The transceiver 504 can provide the lower layer functions that can support the transport of data for the higher layer services ordered by the processor 502. The transceiver 504 can be connected to a first antenna 506 and a second antenna 508 that can transmit and receive signals according to the one or more wireless communication protocols. The use of multiple antennas for certain wireless communication protocols can provide improved performance (e.g. higher data rates and/or better immunity to noise/interference) compared to a single antenna configuration. For example, a multiple input multiple output (MIMO) scheme can be used for mobile terminals 402 connected to the LTE wireless network 400.

Figure 6:
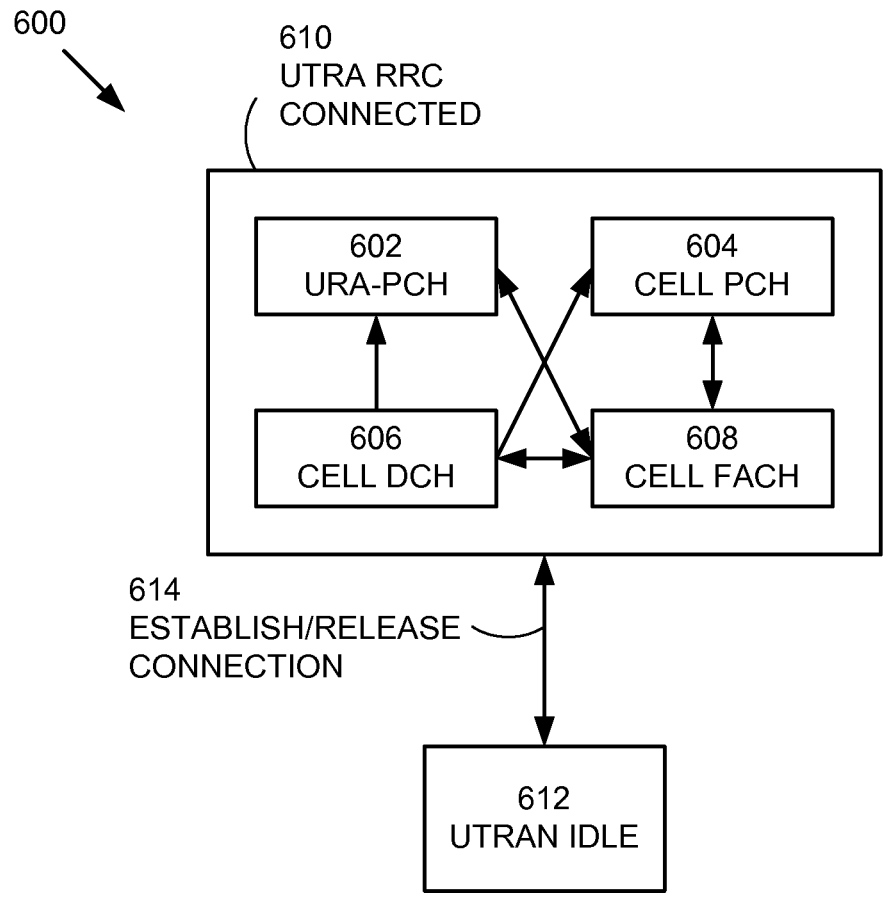
FIG. 6 illustrates a state transition diagram for a mobile wireless communication device for a UMTS wireless network.

FIG. 6 illustrates a state transition diagram 600 having several states for a radio resource control (RRC) portion of a protocol stack for a UE 202 operating in a UMTS wireless network 200. The UE 202 can be in an unconnected UTRAN IDLE state 612 or in a UTRA RRC connected state 610, and the UTRA RRC connected state 610 can include several different states. In the UTRAN IDLE state 612, the UE 202 can request an RRC connection to establish radio resources for communication between the UE 202 and the UMTS wireless network 200 whenever data is available to exchange between UE 202 and the UTRAN 242 in the wireless network 200. The UE 202 can establish the RRC connection when an application in the UE 202 requires a connection to send data or to retrieve data from the UMTS wireless network 200. The UE 202 can also establish the RRC connection when initiating a mobile originated voice connection or completing a mobile terminated voice connection. When the UE 202 has sent a request to the UTRAN 242 to establish a radio connection, the UTRAN 242 can choose a state for the RRC connection between the UE 202 and the wireless network 200. The UTRA RRC connected state 610 can include four separate states for the UE 202: a CELL_DCH state 606, a CELL_FACH state 608, a CELL_PCH state 604 and a URA_PCH state 602. Each of these separate states 602/604/606/608 for the UTRA RRC connected state 610 can provide different capabilities for connections between the UE 202 and the wireless network 200 and can also consume different amounts of power from a battery in the UE 202.

From the UTRAN IDLE state 612, UE 202 can transition initially to the CELL_FACH state 608, in which UE 202 can make an initial data transfer to the UMTS wireless network 200, subsequent to which the UMTS wireless network 200 can determine which of the states 602/604/606/608 in the UTRA RRC connected state 610 to use for continued data transfer between the UE 202 and the UMTS wireless network 200. The wireless network 200 can move UE 202 into the Cell Dedicated Channel (CELL_DCH) state 606 or keep UE 202 in the Cell Forward Access Channel (CELL_FACH) state 608. In CELL_DCH state 606, a dedicated channel can be allocated to UE 202 for both uplink and downlink to exchange data. The CELL_DCH state 606, with a dedicated physical channel allocated to UE 202, can typically consume more battery power from UE 202 than the other states of the UTRA RRC connected state 610, and significantly more battery power than the IDLE state 612. Alternatively, rather than place the UE 202 in the CELL_DCH state, UTRAN 242 can maintain UE 202 in a CELL_FACH state 608. In a CELL_FACH state 608 no dedicated channel can be allocated to UE 202. Instead, common channels can be used to send signaling in relatively small bursts of data. However, UE 202 can continue to monitor common channels in the CELL_FACH state 608, and therefore the UE 202 can consume more battery power than in select alternative states, namely CELL_PCH state 604 and URA_PCH state 602, as well as compared to UTRAN IDLE state 612. While the UTRAN IDLE state 612 can consume the least amount of power, the UE 202 can require a connection establishment 614 when data is available for transfer with the wireless network 200. As such, the user of the UE 202 can in some cases detect a delay for data transfer as the UE 202 transitions from the UTRAN IDLE state to the UTRA RRC connected state 610. For short periods of data inactivity, the user of the UE 202 can prefer to keep the UE 202 in the UTRA RRC connected state 610 rather than transition to the UTRAN IDLE state 612. For longer periods of data inactivity, however, conserving battery power can be preferred and a state having lower power consumption than the CELL DCH 606 state can be preferred.

Figure 7:
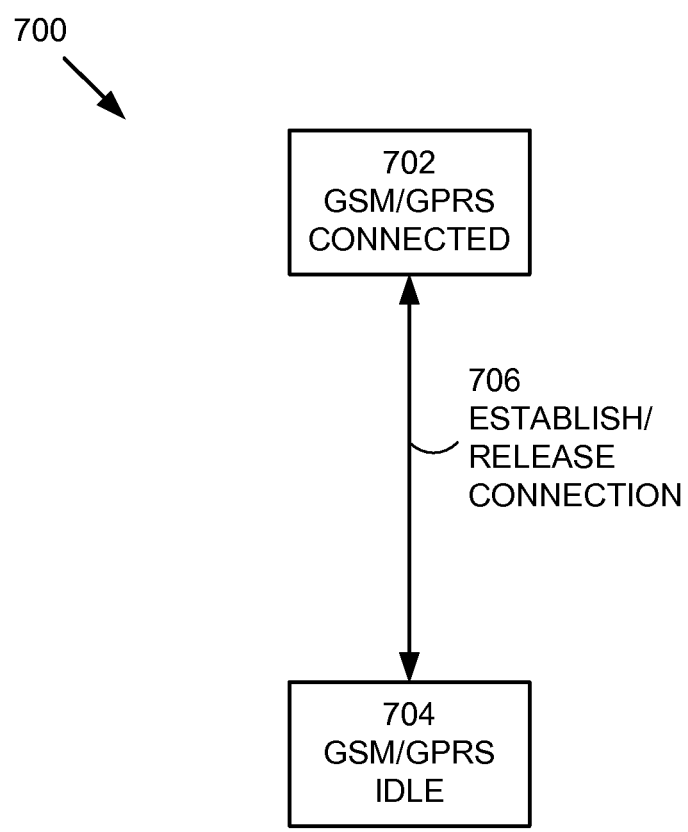
FIG. 7 illustrates a state transition diagram for a mobile wireless communication device for a GSM wireless network.

FIG. 7 illustrates a state transition diagram 700 for a mobile wireless device 102 operating in a GSM/GPRS network. Transitions between a GSM/GPRS connected state 702 and a GSM/GPRS idle state 704 can occur when establishing and releasing connections 706 between the mobile wireless device 102 and the wireless network 100.

Figure 8:
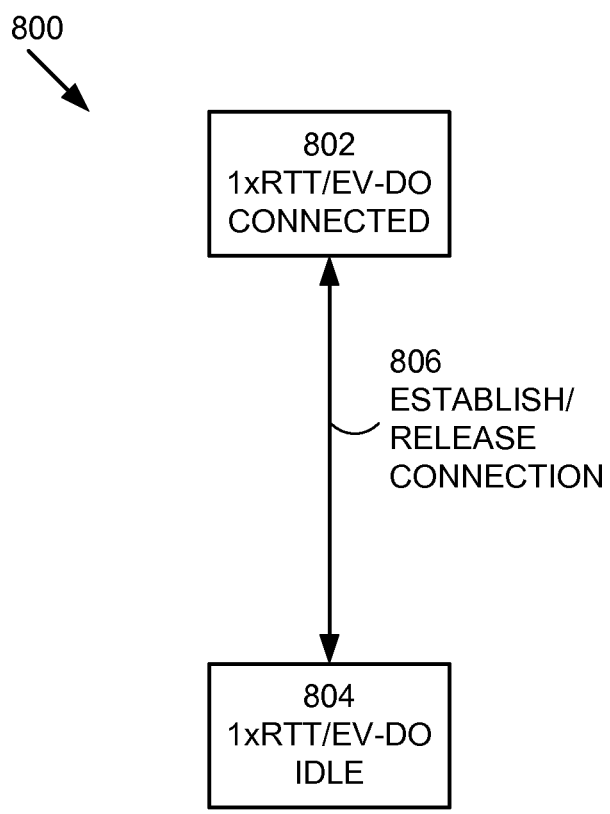
FIG. 8 illustrates a state transition diagram for a mobile wireless communication device for a CDMA2000 1x wireless network.

FIG. 8 illustrates a state transition diagram 800 between states in a CDMA2000 1x/EV-DO wireless network 300. A mobile station 302 in the CDMA2000 1x/EV-DO wireless network 300 can be in a 1xRTT/EV-DO idle state 804 and can establish and release connections 806 to transition between the 1xRTT/EV-DO idle state 804 and the 1xRTT/EV-DO connected state 802.

Figure 9:
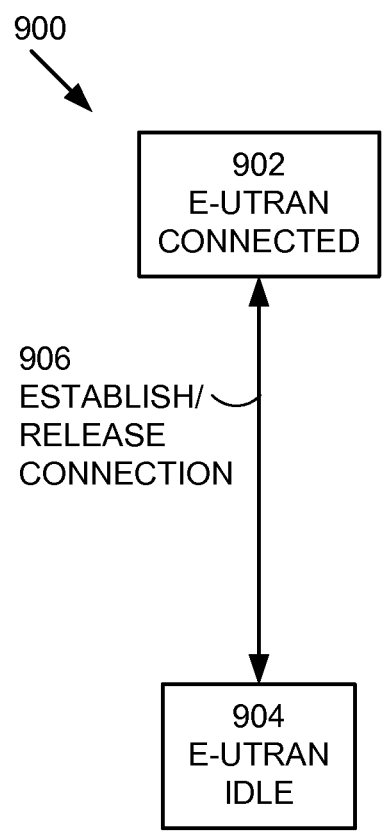
FIG. 9 illustrates a state transition diagram for a mobile wireless communication device for an LTE wireless network.

FIG. 9 illustrates a state transition diagram 900 between states in an LTE/LTE-Advanced wireless network 400. A mobile terminal 402 in the LTE/LTE-Advanced wireless network 400 can be in an E-UTRAN idle state 904 and can establish and release connections 906 to transition between the E-UTRAN idle state 904 and the E-UTRAN connected state 902.

For each of the state transition diagrams 600/700/800/900 illustrated in FIGS. 6-9, the associated wireless network can determine when to transition a mobile wireless device 102 between the states in the state transition diagrams 600/700/800/900. The timeout values used for the state transitions can be not known to the mobile wireless device 102; however, the mobile wireless device 102 can measured network characteristics and store the measured values to later use to determine when state transitions can occur. The mobile wireless device 102 can use the measured network characteristics in combination with knowledge of internal status (e.g. state of internal data buffers) to improve operating performance of the mobile wireless device 102. In a representative embodiment, the mobile wireless device 102 can determine that no additional data remains to be sent, and the mobile wireless device 102 can conserve power by switching to a lower power consuming state earlier than would occur when waiting for the wireless network 100 to determine a data timeout has occurred. In another representative embodiment, the mobile wireless device 102 can prefer to maintain a connection with the wireless network 100 by sending "dummy" data packets in the absence of having other data packets to send and before a network data inactivity timeout can occur. The "dummy" data packets can "keep alive" the connection between the wireless network 100 and the mobile wireless device 102, so that a data connection, signaling connection, PDP context, or other connection required to transmit and receive data by the mobile wireless device 102 is already established when additional data is ready for transfer.

Figure 10:
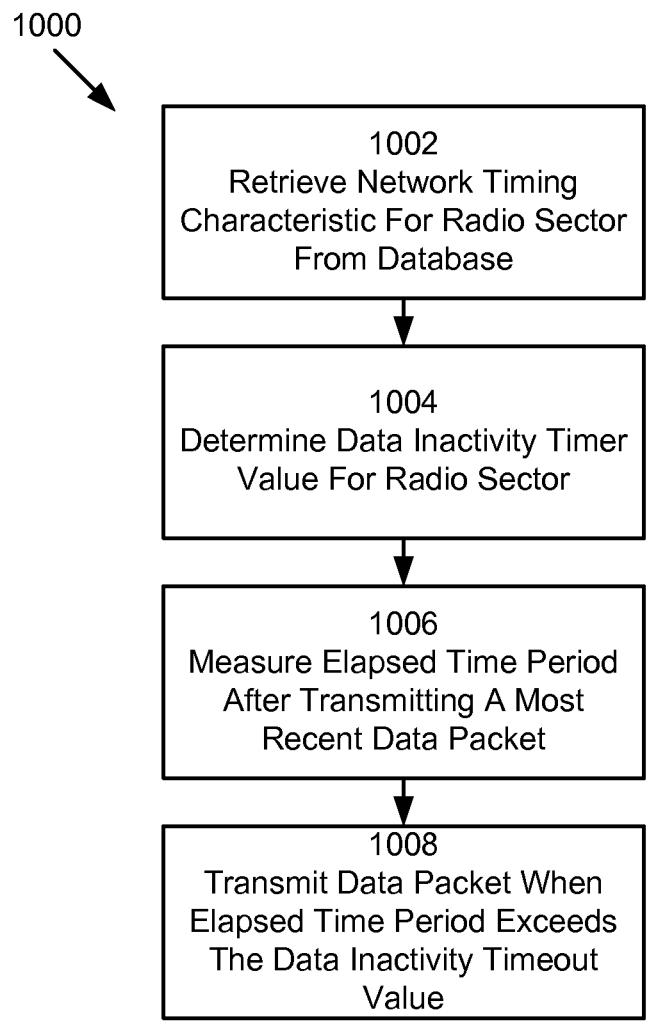
FIG. 10 illustrates a representative method for managing connections between a mobile wireless device and a wireless network.

FIG. 10 illustrates a representative method of managing connections between the mobile wireless device 102 and the wireless network 100. While the method is described for a generic wireless network 100, the same method can equally apply to the UMTS wireless network 200, the CDMA1x/EV-DO wireless network 300 and the LTE wireless network 400. When connected to the radio sector 104 of the wireless network 100, in step 1002, the mobile wireless device 102 retrieves a network timing characteristic for the radio sector 102 from a database. The database is located in the mobile wireless device 102 or in the wireless network infrastructure. In step 1004, the mobile wireless device 102 determines a data inactivity timer value for the radio sector 1004 based on the retrieved network timing characteristic. In a representative embodiment, the retrieved network timing characteristic is a timeout interval for the radio sector 104 of the wireless network 100. In an embodiment, the retrieved network timing characteristic is measured by the mobile wireless device 102 during a previous connection (or during the current connection) and stored in the database for retrieval later by the mobile wireless device 102. The data inactivity timeout value for the radio sector 102 of the wireless network 100 is determined based on the retrieved network timing characteristic. In an embodiment, the determined data inactivity timeout value is less than the timeout period used by the wireless network 100 to release a packet data protocol (PDP) context between the mobile wireless device 102 and the wireless network 100. In step 1006, the mobile wireless device 102 measures an elapsed time period after transmitting a most recent data packet. After transmitting each data packet, the mobile wireless device 102 can measure an inactivity time period when no data packets are received or sent. In an embodiment, the mobile wireless 102 can measure data inactivity time periods only after sending a data packet that empties a transmit data buffer. In step 1008, the mobile wireless device 102 transmits a data packet to the wireless network 100 when the measured elapsed time period exceeds the data inactivity timeout value. The data packet can be a "dummy" data packet solely sent to maintain data activity without any "real" data included or can be an "actual" data packet containing "real" data. As a result of the mobile wireless device 102 transmitting the data packet, the wireless network 100 will detect data activity from the mobile wireless device 102 and thereby reset its own data inactivity timeout mechanisms that could otherwise trigger a change of state for the mobile wireless device 102 or release a connection between the mobile wireless device 102 and the wireless network 100. In an embodiment, by maintaining a PDP context between the mobile wireless device 102 and the wireless network 100, an IP address can be sustained for packet data transmission between the mobile wireless device 102 and the wireless network 100 during brief periods of data inactivity.

In a representative embodiment, the mobile wireless device 102 organizes the database of measured network timing characteristics based on a geographic location identifier for the radio sector 104. The geographic location identifier can be used by the mobile wireless device 102 to associate the radio sector 104 in which the mobile wireless device 102 is currently connected to the wireless network 100 with appropriate stored network timing characteristics in the database. In a representative embodiment, the database of measured network timing characteristics are organized by a combination of a mobile country code (MCC), a mobile network code (MNC) and a radio sector 104 identifier (e.g. cell ID). In a representative embodiment, the mobile wireless device 102 monitors its physical location by tracking at least one of a global positioning system (GPS) location of the mobile wireless device 102, a WiFi access point location and a radio sector 104 (cell) site location. The geographic location identifier associated with the radio sector 104 in the database of measured network timing characteristics can be determined based on the monitored physical location of the mobile wireless device 102.

Figure 11:
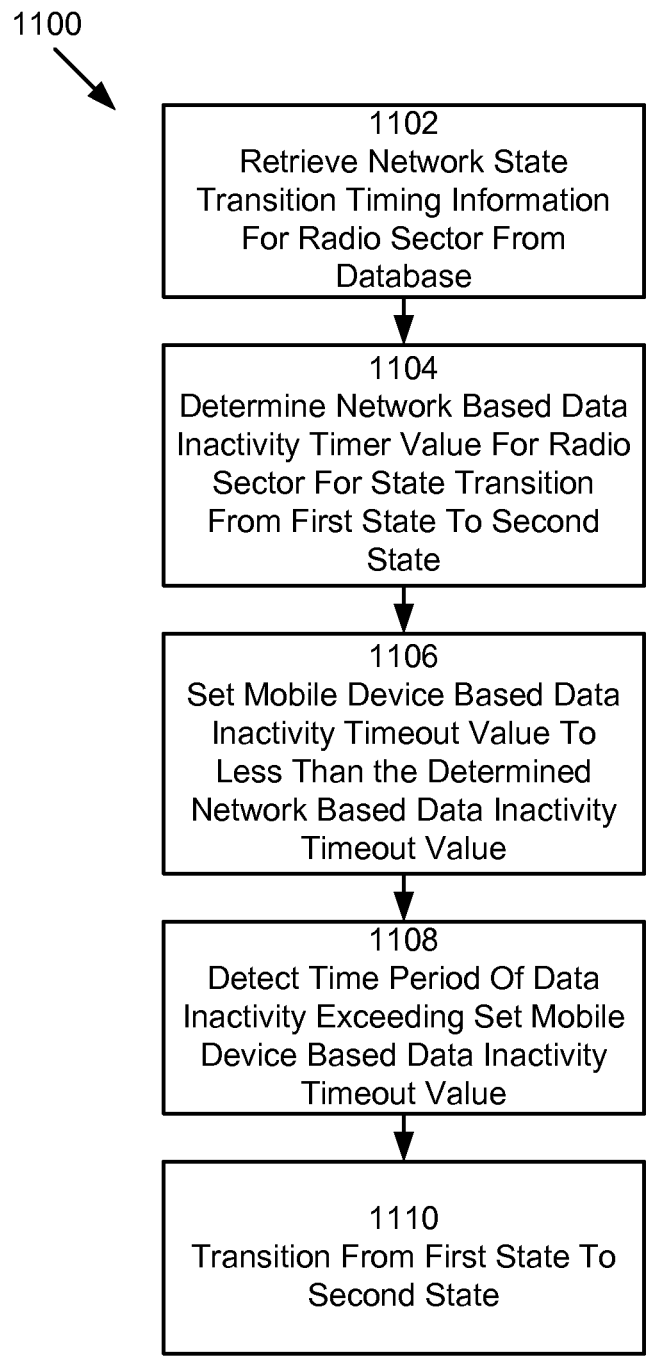
FIG. 11 illustrates a representative method for managing state transitions in a mobile wireless device connected to a radio sector of a wireless network.

FIG. 11 illustrates a representative method of managing state transitions in the mobile wireless device 102 connected to the radio sector 104 of the wireless network 100. The method includes at least the following steps. In step 1102, the mobile wireless device 102 retrieves network state transition timing information for the radio sector 104 from a database. In step 1104, the mobile wireless device 102 determines a network based data inactivity timer value for the radio sector 104 of the wireless network 100 for a state transition from a first state to a second state based on the retrieved network state transition timing information. In step 1106, the mobile wireless device 102 sets a mobile device based data inactivity timeout value to less than the determined network based data inactivity timeout value. In step 1108, the mobile wireless device 102 detects a time period of data inactivity between the mobile wireless device 102 and the wireless network 100 that exceeds the set mobile device based data inactivity timeout value. In step 1110, the mobile wireless device transitions from the first state to the second state. As a result of the steps outlined for the method in FIG. 11, the mobile wireless device 102 transitions from the first state to the second state more quickly than waiting for the wireless network 100 to determine to perform the state transition. In a representative embodiment, the first state represents a state with an active data connection between the mobile wireless device 102 and the wireless network 100, while the second state represents a state having no active data connection between the mobile wireless device 102 and the wireless network 100. In another representative embodiment, the first state is the CELL_DCH state 606 and the second state is the CELL_FACH state 608. In another representative embodiment, the first state is a state for the mobile wireless device 102 having a highest amount of power consumption (among the possible states for the mobile wireless device 102 using the wireless communication protocol supported by the wireless network 100), while the second state is a state having a lower power consumption than the first state. In an embodiment, the first state is one of the UTRA RRC connected states 610, and the second state is the UTRAN IDLE 612 state.

The method 1100 illustrated in FIG. 11 can be extended to include the mobile wireless device 102 measuring at least one network state transition timing information of the radio sector 104 of the wireless network 100 and storing the measured network state transition timing information of the radio sector 104 in the database. The database can be organized by a geographic location identifier for the radio sector 104, for example including an MCC, an MNC and a radio sector (cell) ID. The mobile wireless device 102 can monitor its physical location by tracking one or more of a GPS location, locations of nearby WiFi access points and locations of the radio sector sites (cell sites). The mobile wireless device 102 can use the monitored geographic location identifiers to determine the geographic location identifier for the radio sector stored in the database. In an embodiment, at least a first portion of the database is stored in a database maintained by the wireless network 100 and a second portion of the database is stored in the mobile wireless device 102. The mobile wireless device 102 can update the locally stored database in the mobile wireless device 102 by downloading select information from the remotely stored database in the wireless network 100. Maintaining only a portion of the database locally in the mobile wireless device 102 can limit the amount of memory required in the mobile wireless device 102 to provide information for the method 1100. The mobile wireless device 102 can also retrieve database information from another mobile wireless device 102 through a peer to peer wireless transfer mechanism using a short range wireless communication technology, e.g. Bluetooth, Infrared (IRDA) and Near Field Communication (NFC) or a medium range wireless communication technology, e.g. WiFi. Database information can be then shared between multiple mobile wireless communication devices by a single user or group of users.

Figure 12:
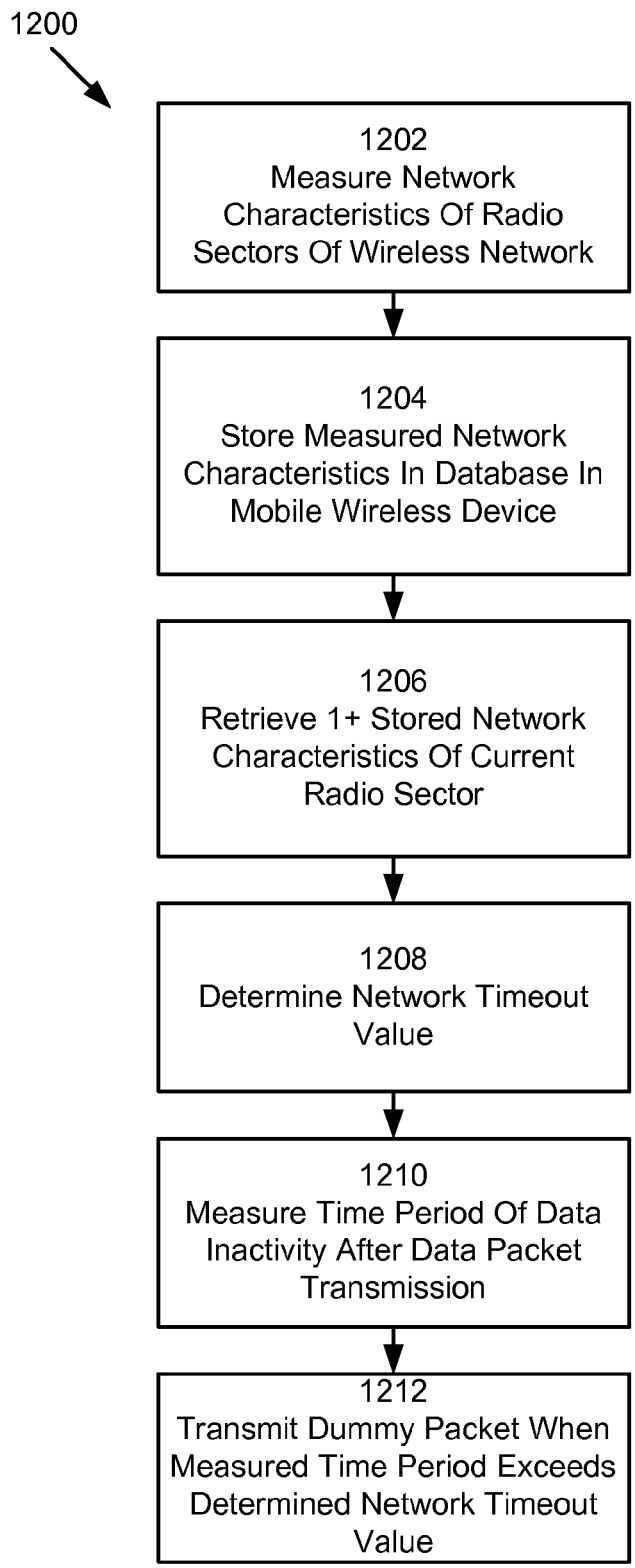
FIG. 12 illustrates a representative method for maintaining an active connection between a mobile wireless device and a radio sector of a wireless network.

FIG. 12 illustrates another method 1200 to manage connections of the mobile wireless device 102 in the wireless network 100. In step 1202, the mobile wireless device measures one or more network characteristics of the radio sectors 104 of the wireless network 100 in which the mobile wireless device 102 operates. In step 1204, the mobile wireless device 102 stores the measured network characteristics in a database in the mobile wireless device 102 for later retrieval. The database in the mobile wireless device 102 can contain measured network characteristics for multiple radio sectors 104 of the wireless network 100. The multiple radio sectors 104 can include a subset of all radio sectors 104 visited by the mobile wireless device 102, e.g. a subset of most recently visited radio sectors 104 or a subset of most frequently visited radio sectors 104. In step 1206, the mobile wireless device 102 retrieves one or more of the stored network characteristics for a current radio sector 104 in which the mobile wireless device 102 is currently operating. In step 1208, the mobile wireless device 102 determines a network timeout value based on the retrieved one or more network characteristics of the current radio sector 104. In step 1210, the mobile wireless device 102 measures a time period of data inactivity at the mobile wireless device 102 after transmitting a data packet through the radio sector 104 of the wireless network 100. In an embodiment, the mobile wireless device 102 measures data inactivity after the most recently transmitted data packet. In another embodiment, the mobile wireless device 102 measures data inactivity after the most recently transmitted data packet only when transmit data buffers for the mobile wireless device 102 are empty. In step 1212, the mobile wireless device 102 transmits a dummy data packet to the wireless network 100 when the measured time period of data inactivity exceeds the determined network timeout value. The determined network timeout value in step 1208 can be less than an actual network timeout value, and thus when sending the dummy packet to the wireless network 100, the mobile wireless device 102 can forestall the wireless network 100 detecting a timeout based on data inactivity with the mobile wireless device 102. The mobile wireless device 102 can thus keep a connection, such as a PDP context, alive with the wireless network 100, even when the mobile wireless device 102 has no actual data to send.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of managing connections between a mobile wireless device and a wireless network when a PDP context is established between the mobile wireless device and the wireless network, the method comprising the mobile wireless device:
   retrieving network timing characteristics of a radio sector of the wireless network from a database;
   determining, by the mobile wireless device, a data inactivity timeout value for the radio sector based on the retrieved network timing characteristics of the radio sector, the data inactivity timeout value indicating a length of an inactive time period during which no data packets are transmitted by the wireless device to the wireless network;
   measuring an elapsed time period after transmitting to the wireless network a most recently transmitted data packet; and
   transmitting a data packet to the wireless network when the elapsed time period exceeds the data inactivity timeout value determined by the mobile wireless device.

2. The method as recited in claim 1, wherein the data inactivity timeout value determined by the mobile wireless device is less than a timeout period used by the wireless network to release the PDP context between the mobile wireless device and the wireless network.

3. The method as recited in claim 1, further comprising the mobile wireless device:
   measuring at least one network timing characteristic of the radio sector of the wireless network; and
   storing the measured at least one network timing characteristic of the radio sector in the database.

4. The method as recited in claim 3, further comprising the mobile wireless device:
   maintaining the database of measured network timing characteristics organized by a geographic location identifiers for radio sectors in the database.

5. The method as recited in claim 3, further comprising the mobile wireless device:
   maintaining the database of measured network timing characteristics organized by a mobile country code (MCC), a mobile network code (MNC) and a radio sector identifier.

6. The method as recited in claim 3, wherein at least a portion of the database is stored in the mobile wireless device.

7. The method as recited in claim 3, wherein at least a portion of the database is stored in a server maintained by the wireless network.

8. The method as recited in claim 4, further comprising the mobile wireless device:
   monitoring a physical location of the mobile wireless device by tracking at least one of a global positioning system location of the mobile wireless device, a Wi-Fi access point location, and a radio sector site location of the wireless network; and
   determining a geographic location identifier for the radio sector based on the monitored physical location of the mobile wireless device.

9. A method of managing state transitions in a mobile wireless device connected to a radio sector of a wireless network, the method comprising the mobile wireless device:
   retrieving network state transition timing information of the radio sector of the wireless network from a database;
   determining, by the mobile wireless device, a network-based data inactivity timeout value for a state transition of the mobile wireless device from a first state to a second state based on the retrieved network state transition timing information of the radio sector of the wireless network;
   setting a mobile wireless device based data inactivity timeout value to less than the determined network-based data inactivity timeout value for the state transition of the mobile wireless device from the first state to the second state;
   detecting a time period of data inactivity at the mobile wireless device exceeding the set mobile wireless device based data inactivity timeout value; and
   transitioning the mobile wireless device from the first state to the second state after detecting the time period of data inactivity at the mobile wireless device.

10. The method as recited in claim 9, wherein the network based data inactivity timeout value is associated with a state transition from the first state having an active data connection between the mobile wireless device and the wireless network to the second state having no active data connection.

11. The method as recited in claim 10, wherein the first state is a CELL_DCH state and the second state is a CELL_FACH state.

12. The method as recited in claim 9, further comprising the mobile wireless device:
measuring network state transition timing information of the radio sector of the wireless network; and
storing the measured network state transition timing information of the radio sector in the database.

13. The method as recited in claim 12, further comprising the mobile wireless device:
maintaining the database of measured network state transition timing information organized by geographic locations identifier for radio sectors in the database.

14. The method as recited in claim 13, wherein the geographic location identifier includes at least a mobile county code (MCC), a mobile network code (MNC) and a radio sector identifier.

15. The method as recited in claim 13, further comprising the mobile wireless device:
monitoring a physical location of the mobile wireless device by tracking at least one of a global positioning system location of the mobile wireless device, a Wi-Fi access point location, and a radio sector site location of the wireless network; and
determining a geographic location identifier for the radio sector based on the monitored physical location of the mobile wireless device.

16. The method as recited in claim 15, wherein at least a first portion of the database is stored in a server maintained by the wireless network and a second portion of the database is stored in the mobile wireless device.

17. A mobile wireless device comprising:
a transceiver to transmit signals to and receive signals from a wireless network; and
a processor configured to cause the mobile wireless device to:
measure network characteristics of radio sectors of the wireless network in which the mobile wireless device operates;
store the measured network characteristics of the radio sectors in a database in the mobile wireless device;
retrieve one or more stored network characteristics of a radio sector to which the mobile wireless device is connected from the database;
determine, by the mobile wireless device, a network timeout value for the radio sector to which the mobile wireless device is connected based on the retrieved one or more network characteristics of the radio sector;
measure a time period of data inactivity during which the mobile wireless device transmits no data packets to the wireless network after transmission of a most recently transmitted data packet; and
transmit a dummy data packet to the wireless network when the measured time period of data inactivity exceeds the determined network timeout value and transmit data buffers are empty.

18. The mobile wireless device as recited in claim 17, wherein the processor is further configured to cause the mobile wirelss device to:
maintain the database of measured network characteristics of the radio sectors organized by geographic location identifiers for radio sectors in the database.

19. The mobile wireless device as recited in claim 18, wherein the processor is further configured to cause the mobile wirelss device to:
monitor a physical location of the mobile wireless device by tracking at least one of a global positioning system location of the mobile wireless device, a Wi-Fi access point location, and a radio sector site location of the wireless network; and
determine a geographic location identifier for the radio sector to which the mobile wireless device is connected based on the monitored physical location of the mobile wireless device.

20. The mobile wireless device as recited in claim 17, wherein the processor is further configured to cause the mobile wirelss device to:
maintain the database of measured network characteristics of the radio sectors organized by a mobile country code (MCC), a mobile network code (MNC) and a radio sector identifier.

21. The mobile wireless device as recited in claim 17, wherein the determined network timeout value is less than a timeout period used by the wireless network to release a PDP context between the mobile wireless device and the wireless network.

22. A computer program product encoded in a non-transitory computer readable medium for managing state transitions in a mobile wireless device connected to a radio sector of a wireless network, the computer program product comprising computer program code, which when executed by a processor, causes the mobile wireless device to:
retrieve network characteristics of the radio sector of the wireless network to which the mobile wireless device is connected from a database;
determine by the mobile wireless device, a network-based data inactivity timeout value for a state transition of the mobile wireless device from a first state to a second state based on the retrieved network characteristics of the radio sector of the wireless network;
set a mobile wireless device based data inactivity timeout value to less than the determined network based data inactivity timeout value for the state transition of the mobile wireless device from the first state to the second state;
detect a time period of data inactivity at the mobile wireless device exceeding the set mobile wireless device based data inactivity timeout value; and
transition the mobile wireless device from the first state to the second state after detecting the time period of data inactivity at the mobile wireless device.

23. The computer program product as recited in claim 22, wherein the network based data inactivity timeout value is associated with a state transition from the first state having an active data connection between the mobile wireless device and the wireless network to the second state having no active data connection.

24. The computer program product as recited in claim 23, wherein the first state is a CELL_DCH state and the second state is a CELL_FACH state.

25. The computer program product as recited in claim 22, further comprising computer program code, which when executed by the processor, causes the mobile wireless device to:
measure network characteristics of the radio sector of the wireless network in which the mobile wireless device operates;
store the measured network characteristics of the radio sector in the database.

* * * * *

UNITED STATES PATENT AND TRADEMARK OFFICE
CERTIFICATE OF CORRECTION

PATENT NO. : 8,837,366 B2  Page 1 of 1
APPLICATION NO. : 13/423875
DATED : September 16, 2014
INVENTOR(S) : Li Li It is certified that error appears in the above-identified patent and that said Letters Patent is hereby corrected as shown below:

In the Claims:

Column 15, line 57 (Claim 18, line 3): "wirelss" should read --wireless--.

Column 15, line 63 (Claim 19, line 3): "wirelss" should read --wireless--.

Column 16, line 10 (Claim 20, line 3): "wirelss" should read --wireless--.

Signed and Sealed this
Thirtieth Day of December, 2014

Michelle K. Lee
*Deputy Director of the United States Patent and Trademark Office*